United States Patent [19]

Takeuchi

[11] Patent Number: 5,441,336
[45] Date of Patent: Aug. 15, 1995

[54] FLUID PRESSURE REGULATING DEVICE FOR ANTI-SKID CONTROL DEVICE

[75] Inventor: Hiroaki Takeuchi, Toyota, Japan

[73] Assignee: Aisin Seiki Kabushiki Kaisha, Kariya, Japan

[21] Appl. No.: 162,656

[22] Filed: Dec. 7, 1993

[30] Foreign Application Priority Data

Dec. 8, 1992 [JP] Japan .................. 4-328227

[51] Int. Cl.⁶ .................................. B60T 8/46
[52] U.S. Cl. .................. 303/116.1; 303/119.1; 303/900
[58] Field of Search ............... 303/116.1, 119.1, 115.4, 303/113.1, 113.5, 900, 901

[56] References Cited

U.S. PATENT DOCUMENTS

| | | | |
|---|---|---|---|
| 5,046,788 | 9/1991 | Lindenman | 303/116.1 |
| 5,219,210 | 6/1993 | Machara | 303/119.1 X |

FOREIGN PATENT DOCUMENTS

| | | | |
|---|---|---|---|
| 3700282 | 7/1987 | Germany | 303/116.1 |
| 61-235254 | 10/1986 | Japan . | |
| 2160950 | 7/1987 | Japan | 303/116.1 |
| 1164663 | 6/1989 | Japan | 303/116.1 |
| 2-220953 | 9/1990 | Japan . | |
| 3007646 | 1/1991 | Japan | 303/116.1 |

*Primary Examiner*—Robert J. Oberleitner
*Assistant Examiner*—Peter M. Poon
*Attorney, Agent, or Firm*—Burns, Doane, Swecker & Mathis

[57] ABSTRACT

A fluid pressure regulating device for an anti-skid control device includes a master cylinder having therein a first pressure chamber and a second pressure chamber, a first wheel cylinder, a first electromagnetic valve of normally open type, a second wheel cylinder, a second electromagnetic valve of normally open type, a first conduit for connecting the first pressure chamber to the first wheel cylinder and the second wheel cylinder via the first electromagnetic valve and the second electromagnetic valve, respectively, a first pump for sucking irreversibly fluids in the first cylinder and the second cylinder via an orifice in such a manner that the resultant fluids are expected to be discharged irreversibly into the first conduit, a third wheel cylinder, a third electromagnetic valve of normally open type, a fourth wheel cylinder, a fourth electromagnetic valve of normally open type, a second conduit for connecting the third pressure chamber to the third wheel cylinder and the fourth wheel cylinder via the third electromagnetic valve and the fourth electromagnetic valve, respectively, a second pump for sucking irreversibly fluids in the third cylinder and the fourth cylinder via an orifice in such a manner that the resultant fluids are expected to be discharged irreversibly into the second conduit, and a motor for driving the first pump and the second pump.

6 Claims, 2 Drawing Sheets

FLUID PRESSURE REGULATING DEVICE FOR ANTI-SKID CONTROL DEVICE

BACKGROUND OF THE INVENTION

The present invention relates to a fluid pressure regulating device for an anti-skid control device.

Japanese Patent Laid-open Print No. 61-235254 published on Oct. 20, 1986 without examination discloses a conventional anti-skid control device. In this anti-skid control device, there is provided a pressure responsive valve in order that a fluid pressure is applied to both rear wheel cylinders in dependence upon the fluid pressure of one of the front wheel cylinders or the other whichever is smaller.

However, an employment of the pressure responsive valve will bring an increase of the number of parts and complexity in piping.

SUMMARY OF THE INVENTION

It is, therefore, an object of the present invention to provide a fluid pressure regulating device for an anti-skid control device without the foregoing drawbacks.

It is another object of the present invention to provide a fluid pressure regulating device for an anti-skid control device which is simple in structure.

In order to attain the foregoing objects, a fluid pressure regulating device for an anti-skid control includes a master cylinder having therein a first pressure chamber and a second pressure chamber, a first wheel cylinder, a first electromagnetic valve of normally open type, a second wheel cylinder, a second electromagnetic valve of normally open type, a first conduit for connecting the first pressure chamber to the first wheel cylinder and the second wheel cylinder via the first electromagnetic valve and the second electromagnetic valve, respectively, a first pump for sucking irreversibly fluids in the first cylinder and the second cylinder via orifice means in such a manner that the resultant fluids are expected to be discharged irreversibly into the first conduit, a third wheel cylinder, a third electromagnetic valve of normally open type, a fourth wheel cylinder, a fourth electromagnetic valve of normally open type, a second conduit for connecting the third pressure chamber to the third wheel cylinder and the fourth wheel cylinder via the third electromagnetic valve and the fourth electromagnetic valve, respectively, a second pump for sucking irreversibly fluids in the third cylinder and the fourth cylinder via orifice menas in such a manner that the resultant fluids are expected to be discharged irreversibly into the second conduit, and a motor for driving the first pump and the second pump.

BRIEF DESCRIPTION OF THE DRAWINGS

The above and other objects, features and advantages of the present invention will be more apparent and more readily appreciated from the following detailed description of preferred exemplarily embodiment of the present invention, taken in connection with the accompanying drawings, in which.

DESCRIPTION OF THE PREFERRED EMBODIMENTS

An embodiment of the present invention will be described hereinunder in detail with reference to the accompanying drawings.

Figure 1:
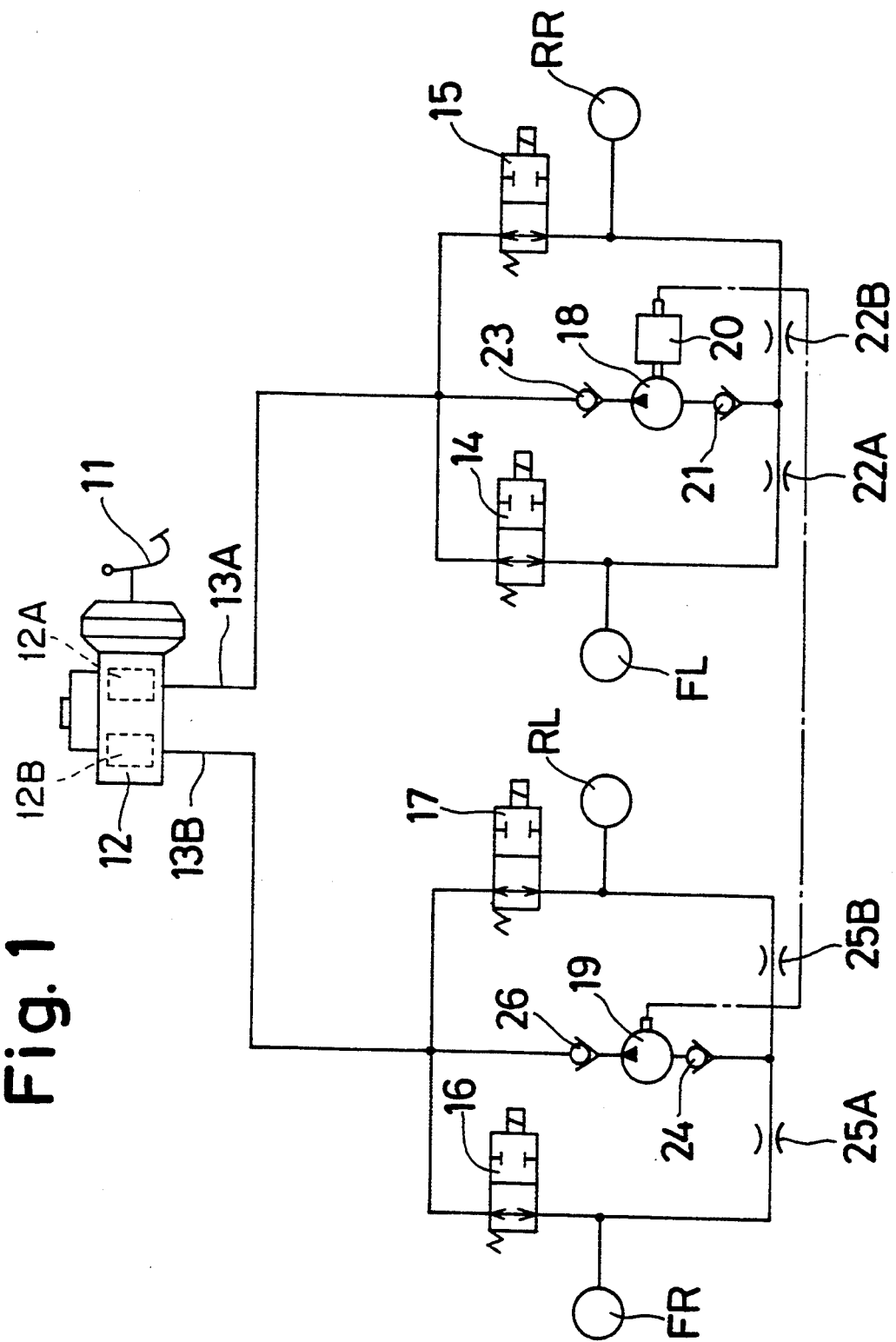
FIG. 1 is a diagram showing a first embodiment of an anti-skid control device according to the present invention.

Referring first to FIG. 1 wherein a first embodiment of a fluid pressure regulating device for an anti-skid control device in accordance with the present invention is illustrated, a tandem type master cylinder 12 which is in association with a brake pedal 11 has a first pressure chamber 12A and a second pressure chamber 12B as well known. The first pressure chamber 12A is in fluid communication with a front-left wheel brake cylinder FL via a first conduit 13A and a first electro-magnetic valve 14. The first pressure chamber 12A is also in fluid communication with a rear-right wheel cylinder RR via the first conduit 13A and a second electro-magnetic valve 15. The second pressure chamber 12B is in fluid communication with a front-right wheel cylinder FR via a second conduit 13B and a third electro-magnetic valve 16. The second pressure chamber 12B is also in fluid communication with a rear-left wheel cylinder RL via the second conduit 13B and a fourth electro-magnetic valve 17.

A first pump 18 and a second pump 19 are driven by a common motor 20. The first pump 18 sucks a fluid in the wheel cylinder FL (the wheel brake RR) via an orifice 22A and a sucking side one-way valve 21 (an orifice 22B and the one-way valve 21) and discharges the fluid into the conduit 13A via a discharging side one-way valve 23. Similarly, the second pump 19 sucks a fluid in the wheel cylinder FR (the wheel cylinder RL) via an orifice 25A and a sucking side one-way valve 24 (an orifice 25B and the one-way valve 24) and discharges the fluid into the conduit 13B via a discharging side one-way valve 26.

In operation, when the brake pedal 11 is depressed, the resultant fluid pressure is supplied from the master cylinder 12 to the wheel cylinders RR, FL, FR and RL for the braking operation as well known. During the braking operation, depending on a behavior or condition of each wheel which is being watched by a controller (not shown), the electromagnetic valves 14–17 are actuated independently and the motor 20 is turned on, in order to regulate or adjust the fluid pressure to be supplied to each wheel cylinder. In detail, as for the rear right road-wheel, when the brake pedal 11 is depressed, the fluid pressure whose degree or magnitude is in proportion to the depression stroke is supplied through the normally open type electro-magnetic valve 15 to the rear right wheel cylinder RR in order to establish the braking operation of the rear right road-wheel. When the slip rate of the rear right road-wheel is found to be excessive due to the resultant braking operation, the fluid pressure supply to the electro-magnetic valve 15 is closed. Simultaneously, the motor 20 is turned on for driving the pump 18, which results in that the fluid under pressure in the rear right wheel cylinder RR is pumped out. Thus, the slip rate of the rear right road-wheel is decreased. The amount of the fluid to be pumped out from the rear right wheel cylinder RR is restricted by the orifice 22B, and is smaller than that of the fluid supplied to the rear right wheel cylinder RR. This enables that even though the pump 18 is being driven if the slip rate is found to be insufficient the fluid pressure in the right wheel cylinder RR is increased by opening the electromagnetic valve 15 again. The slope of the increasing rate of the fluid pressure in the rear right wheel cylinder RR depends on the radius of the orifice 22B, which means that the orifice 22B serves for preventing a rapid use of the fluid pressure in the rear right wheel cylinder RR. When the brake pedal 11 is released for the termination of the braking operation, the fluid in the rear right wheel cylinder RR is drained from the orifice 22B.

Figure 2:
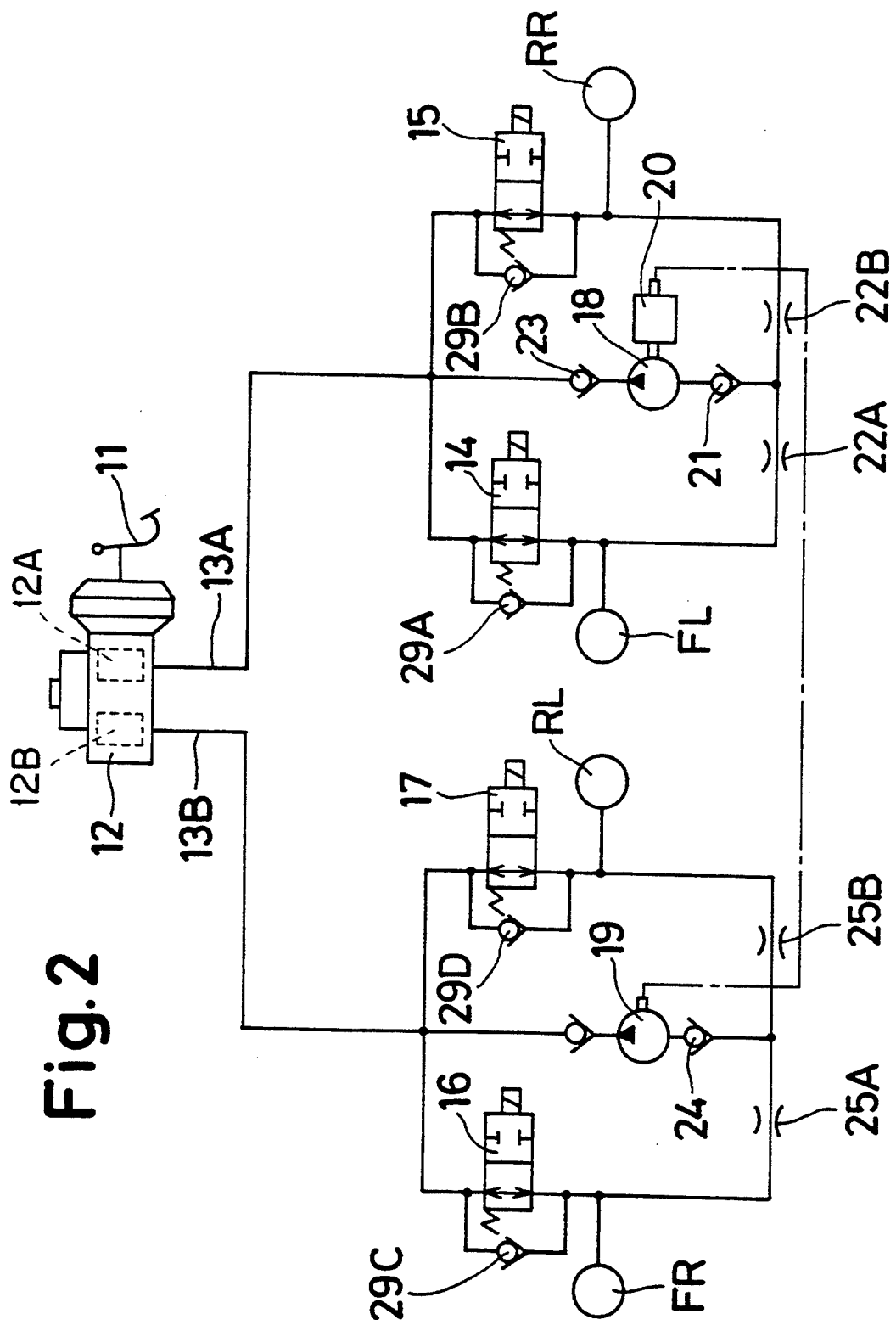
FIG. 2 is a diagram showing a second embodiment of an anti-skid control device according to the present invention.

Referring to FIG. 2 wherein a second embodiment of a fluid pressure regulating device for an anti-skid control device in accordance with the present invention is illustrated, a tandem type master cylinder 12 which is in association with a brake pedal 11 has a first pressure chamber 12A and a second pressure chamber 12B as well known. The first pressure chamber 12A is in fluid communication with a front-left wheel brake cylinder FL via a first conduit 13A and a first electro-magnetic valve 14. The first pressure chamber 12A is also in fluid communication with a rear-right wheel brake cylinder RR via the first conduit 13A and a second electro-magnetic valve 15. The second pressure chamber 12B is in fluid communication with a front-right wheel brake cylinder FR via a second conduit 13B and a third electro-magnetic valve 16. The second pressure chamber 12B is also in fluid communication with a left-rear wheel brake cylinder RL via the second conduit 13B and a fourth electro-magnetic valve 17.

A one-way valve 29A (29B) is disposed between the wheel cylinder FL (RR) and the conduit 13A so as to be in parallel arrangement with the electro magnetic valve 14 (15) for assuring the fluid flow from the wheel cylinder FL (RR) into the conduit 13A even though the electro-magnetic valve 14 (15) is being closed. Similarly, a one-way valve 29C (29D) is disposed between the wheel cylinder FR (RL) and the conduit 13B so as to be in parallel arrangement with the electro-magnetic valve 16 (17) for assuring the fluid flow from the wheel cylinder FR (RL) into the conduit 13B even though the electro-magnetic valve 16 (17) is being closed.

A first pump 18 and a second pump 19 are driven by a common motor 20. The first pump 18 sucks a fluid in the wheel brake cylinder FL (the wheel brake cylinder RR) via an orifice 22A and a sucking side one-way valve 21 (an orifice 22B and the one-way valve 21) and discharges the fluid into the conduit 13A via a discharging side one-way valve 23. Similarly, the second pump 19 sucks a fluid in the wheel brake cylinder FR (the wheel brake cylinder RL) via an orifice 25A and a sucking side one-way valve 24 (an orifice 25B and the one-way valve 24) and discharges the fluid into the conduit 13B via a discharging side one-way valve 26.

An operation of the second embodiment is identical to that of the first embodiment except that in the former the drained fluid is passed through each the one-way valve 29A/29B/29C/29D regardless of the opening condition of each the electromagnetic valve 14/15/16/17.

As apparent from the foregoing descriptions, an elimination of a pressure response regulating valve can be established, which results in a simplification of the anti-skid control device.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A fluid pressure regulating device for an anti-skid control device comprising:
   brake master cylinder;
   wheel cylinder;
   a conduit disposed between the brake master cylinder and the wheel cylinder;
   a valve provided in the conduit for opening and closing the conduit during operation of an anti-skid control and for opening the conduit during non-operation of the anti-skid control;
   a return conduit disposed between the brake master cylinder and the wheel cylinder for returning fluid from the wheel cylinder toward the brake master cylinder;
   a pump provided in the return conduit;
   an orifice provided in the return conduit and located between the wheel cylinder and the pump, said orifice maintaining a pressure increase in the wheel cylinder while the wheel cylinder is communicated with the brake master cylinder and maintaining a pressure decrease in the wheel cylinder while the wheel cylinder is out of communication with the brake master cylinder.

2. A fluid pressure regulating device for an anti-skid control device comprising:
   a brake master cylinder having a first pressure chamber and a second pressure chamber;
   a first wheel cylinder;
   a first conduit disposed between the first chamber and the first wheel cylinder;
   a first valve provided in the first conduit for opening and closing the first conduit during operation of an anti-skid control and for opening the first conduit during non-operation of the anti-skid control;
   a second wheel cylinder;
   a second conduit disposed between the first chamber and the second wheel cylinder;
   a second valve provided in the second conduit for opening and closing the second conduit during operation of the anti-skid control and for opening the second conduit during non-operation of the anti-skid control;
   a first return conduit disposed between the first and second wheel cylinders and the first chamber;
   a first pump provided in the first return conduit;
   a first orifice provided in the first return conduit and located between the first wheel cylinder and the first pump;
   a second orifice provided in the first return conduit and located between the second wheel cylinder and the first pump;
   the first and the second orifices maintaining a pressure increase in the first and the second wheel cylinders while the first and the second wheel cylinders are communicated with the first chamber, and the first and the second orifices maintaining a pressure decrease in the first and the second wheel cylinders while the first and the second wheel cylinders are out of communication with the first chamber;
   a third wheel cylinder;
   a third conduit disposed between the second chamber and the third wheel cylinder;
   a third valve provided in the third conduit for opening and closing the third conduit during operation of the anti-skid control and for opening the third conduit during non-operation of the anti-skid control;

a fourth wheel cylinder;

a fourth conduit disposed between the second chamber and the fourth wheel cylinder;

a fourth valve provided in the fourth conduit for opening and closing the fourth conduit during operation of the anti-skid control and for opening the fourth conduit during non-operation of the anti-skid control;

a second return conduit disposed between the third and fourth wheel cylinders and the second chamber;

a second pump provided in the second return conduit;

a third orifice provided in the second return conduit and located between the third wheel cylinder and the second pump;

a fourth orifice provided in the second return conduit and located between the fourth wheel cylinder and the second pump;

the third and the fourth orifices maintaining a pressure increase in the third and fourth wheel cylinders while the third and fourth wheel cylinders are in communication with the second chamber, the third and the fourth orifices maintaining a pressure decrease in the third and the fourth wheel cylinders while the third and fourth wheel cylinders are out of communication with the second chamber.

3. A fluid pressure regulating device for an anti-skid control device comprising:

a master cylinder for generating a pressure;

a first wheel cylinder;

a conduit connecting the master cylinder to the first wheel cylinder;

a first electromagnetic valve for opening and closing the conduit;

a pump disposed between the master cylinder and the wheel cylinder for returning fluid pressure from the wheel cylinder to the master cylinder; and a first orifice disposed between the pump and the wheel cylinder, said first orifice regulating a pressure decrease in the first wheel cylinder while the first electromagnetic valve is closed and also regulating a pressure increase in the first wheel cylinder while the first electromagnetic valve is opened.

4. A fluid pressure regulating device according to claim 3, including a second wheel cylinder, a branch conduit connecting the master cylinder to the second wheel cylinder, and a second electromagnetic valve for opening and closing the branch conduit, a second orifice regulating a pressure decrease in the second wheel cylinder while the second electromagnetic valve is closed and also regulating a pressure increase in the second wheel cylinder while the second electromagnetic valve is opened.

5. A fluid pressure regulating device according to claim 3, wherein the first orifice defines an increasing rate of pressure in the first cylinder.

6. A fluid pressure regulating device according to claim 3, wherein the first orifice defines a decreasing rate of the pressure in the first cylinder.

* * * * *